(12) United States Patent
Coulon et al.

(10) Patent No.: US 12,341,664 B2
(45) Date of Patent: Jun. 24, 2025

(54) NETWORK LOCAL CONNECTIVITY DEMAND PREDICTION METHOD AND DEVICE

(71) Applicant: LYTN SA, Montpellier (FR)

(72) Inventors: Etienne Coulon, Claix (FR); Jean-Michel Cambot, Castelnau-le-Lez (FR)

(*) Notice: Subject to any disclaimer, the term of this patent is extended or adjusted under 35 U.S.C. 154(b) by 0 days.

(21) Appl. No.: 18/306,406

(22) Filed: Apr. 25, 2023

(65) Prior Publication Data

US 2024/0364597 A1 Oct. 31, 2024

(51) Int. Cl.
*H04L 41/147* (2022.01)
*H04L 41/046* (2022.01)
*H04L 41/16* (2022.01)
*H04L 43/04* (2022.01)
*H04L 43/0811* (2022.01)

(52) U.S. Cl.
CPC .......... *H04L 41/147* (2013.01); *H04L 41/046* (2013.01); *H04L 41/16* (2013.01); *H04L 43/04* (2013.01); *H04L 43/0811* (2013.01)

(58) Field of Classification Search
None
See application file for complete search history.

(56) References Cited

U.S. PATENT DOCUMENTS

| 2020/0028746 | A1* | 1/2020 | Zawadzki | H04L 43/0876 |
| 2021/0392052 | A1* | 12/2021 | Soryal | G06N 20/00 |
| 2022/0215319 | A1* | 7/2022 | Amrod | G06N 5/025 |
| 2022/0239562 | A1* | 7/2022 | Raymond | G06F 11/3055 |
| 2022/0400149 | A1* | 12/2022 | Pandey | G06Q 30/02 |

FOREIGN PATENT DOCUMENTS

EP 2187567 A1 * 5/2010 .......... H04L 41/147

* cited by examiner

*Primary Examiner* — Brian Whipple
(74) *Attorney, Agent, or Firm* — Patshegen IP; Moshe Pinchas

(57) ABSTRACT

The network local connectivity demand prediction method (100), comprises:
a step (105) of long-term local connectivity demand prediction, by a machine learning model operated by a local agent,
in a duration equivalent to the duration of the long-term prediction, more than one short-term iteration of:
a step (110) of aggregating values representative of, at least:
a connectivity demand of the network comprising at least a physical network device,
a purpose of use of the network comprising at least a physical network device,
a local long-term connectivity demand prediction for the physical network device,
a step (115) of training a machine learning device to produce a machine learning model to provide a long-term local connectivity demand prediction, and
a step (120) of deploying the machine learning model, and
a step (125) of updating the long-term local connectivity demand prediction.

12 Claims, 3 Drawing Sheets

NETWORK LOCAL CONNECTIVITY DEMAND PREDICTION METHOD AND DEVICE

TECHNICAL FIELD OF THE INVENTION

The present invention relates to a network local connectivity demand prediction method and to a network local connectivity demand prediction device. It applies, in particular, to the field of information technology infrastructure management.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The perpetual increase in consumption of digital information puts information technology infrastructures under strain, which can lead to connectivity issues (increased response times, disconnections, faulty transfer of information).

The reasons impacting these infrastructures vary greatly in nature and in seasonality.

In current systems, monitoring agents are embedded into network devices and configured to report, according to determined agent operational parameters, upon the demand of the said network devices.

Such infrastructures are limited in their capacity to adapt to demand changes, considering their limited demand predicting capabilities.

Such systems, limited to network demand analysis, also fail to take into account the reasons for the use of the infrastructure, which can have its own variation in nature and seasonality.

Therefore, there does not exist today reliable information technology infrastructure demand predicting tools, and, consequently, there does not exist optimized information technology infrastructures.

SUMMARY OF THE INVENTION

The present invention aims at overcoming the above-mentioned drawbacks as well as other drawbacks that could be overcome although not mentioned in the description below.

The concept of the present invention relates to the use of local network agents, associated with network devices, said agents presenting the capacity to formulate long-term predictions based on the operation of machine learning model trained by a central authority. Furthermore, in between the initial prediction and the end of the prediction term, the machine learning model is retrained and reused to update the initial prediction, leading to a more accurate prediction capacity.

Such an invention differs from edge prediction computing, which requires significant computing power, as the model is not trained locally but remotely while the outcome of the training is used locally.

In particular embodiments, for low resource physical network devices (FGPA or small micro-controllers), the trained machine learning model is compiled, or transformed, into a prediction algorithm, such as a decision tree for example. In such cases, the local network agents are limited to operating a simple algorithm which has the benefits of originating from a machine learning device.

In particular embodiments, for higher resource physical network device, an optimal algorithm may be used to leverage the benefits of the machine learning being performed by the central authority. Such an algorithm may be obtained by transforming the trained machine learning model, for example. For example, a central machine learning device may be operated as a classifier to associate tags for objects, which may then be executed locally to perform costless algorithms like ExtraTreesRegressor or XGBoost, for example. This allows to make a local decision with no need of a connection to the central authority, in real time, store local these decisions and failures, and send those data to the central authority, at a decided frequency and/or as soon as a connection is available. The local storage must be able to store enough data before transmission is possible.

In such embodiments, the trained machine learning model can correspond to the determination of a "best of X" algorithm, wherein the X corresponds to a number of specific machine learning models.

Such an invention may take the form of a cloud solution (installed on a customer's server) providing IT infrastructure providing governance metrics and analytics and interacting with a user to mitigate future risks on the infrastructure based upon the predictions of local agents.

Such an invention allows for local, real-time and resilient decisions, and centralized global analysis to learn from all physical network devices, mutualize the knowledge, and to (re-)deploy updated models at the edge.

BRIEF DESCRIPTION OF THE DRAWINGS

Other advantages, purposes and particular characteristics of the invention shall be apparent from the following non-exhaustive description of at least one particular method or device object of this invention, in relation to the drawings annexed hereto, in which.

DETAILED DESCRIPTION OF THE INVENTION

Figure 1:
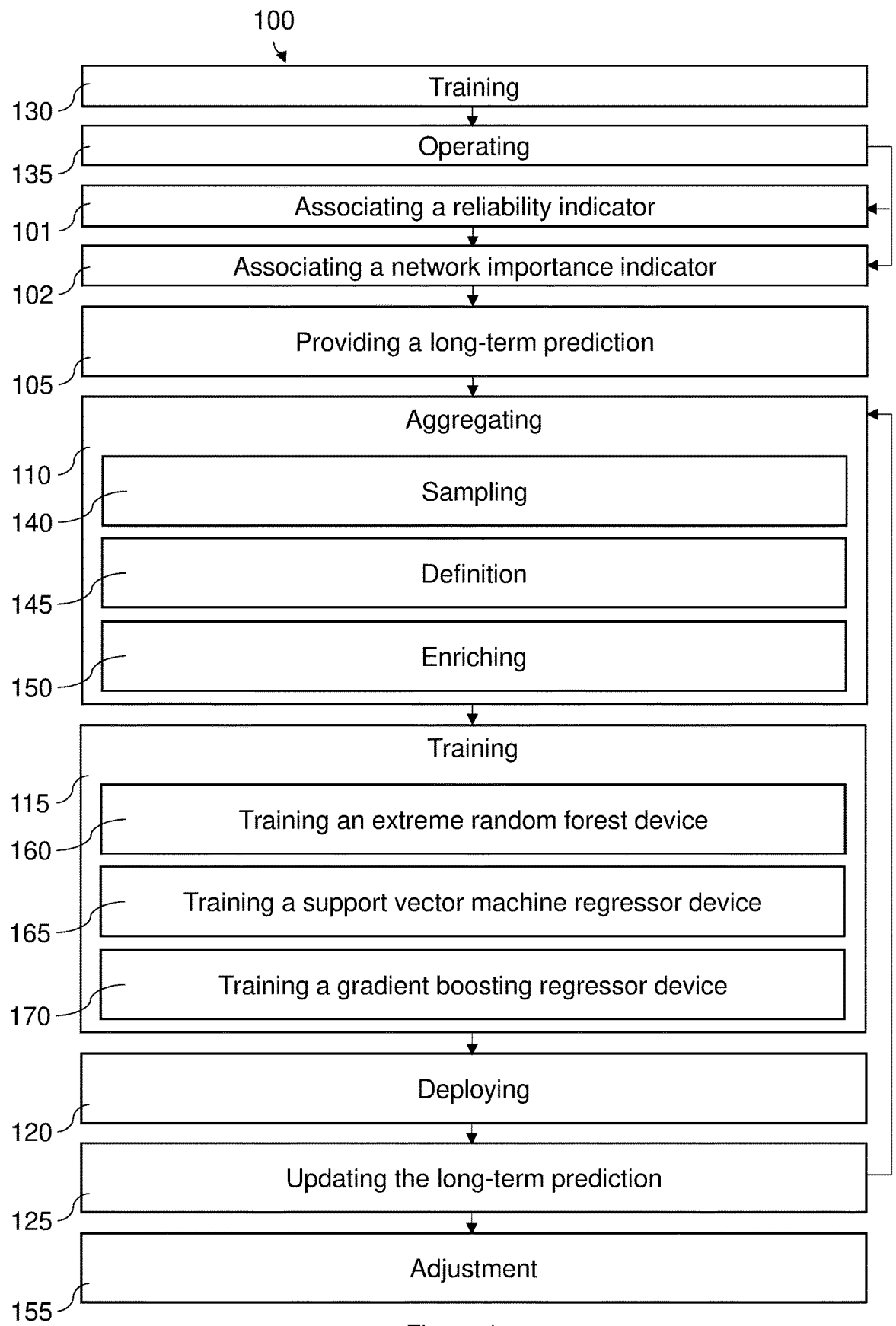
FIG. 1 represents, schematically and in the form of a flowchart, a particular succession of steps of method object of the present invention.

This description is not exhaustive, as each feature of one embodiment may be combined with any other feature of any other embodiment in an advantageous manner.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood as inclusive.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

It should be noted that the figures are not to scale.

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 2:
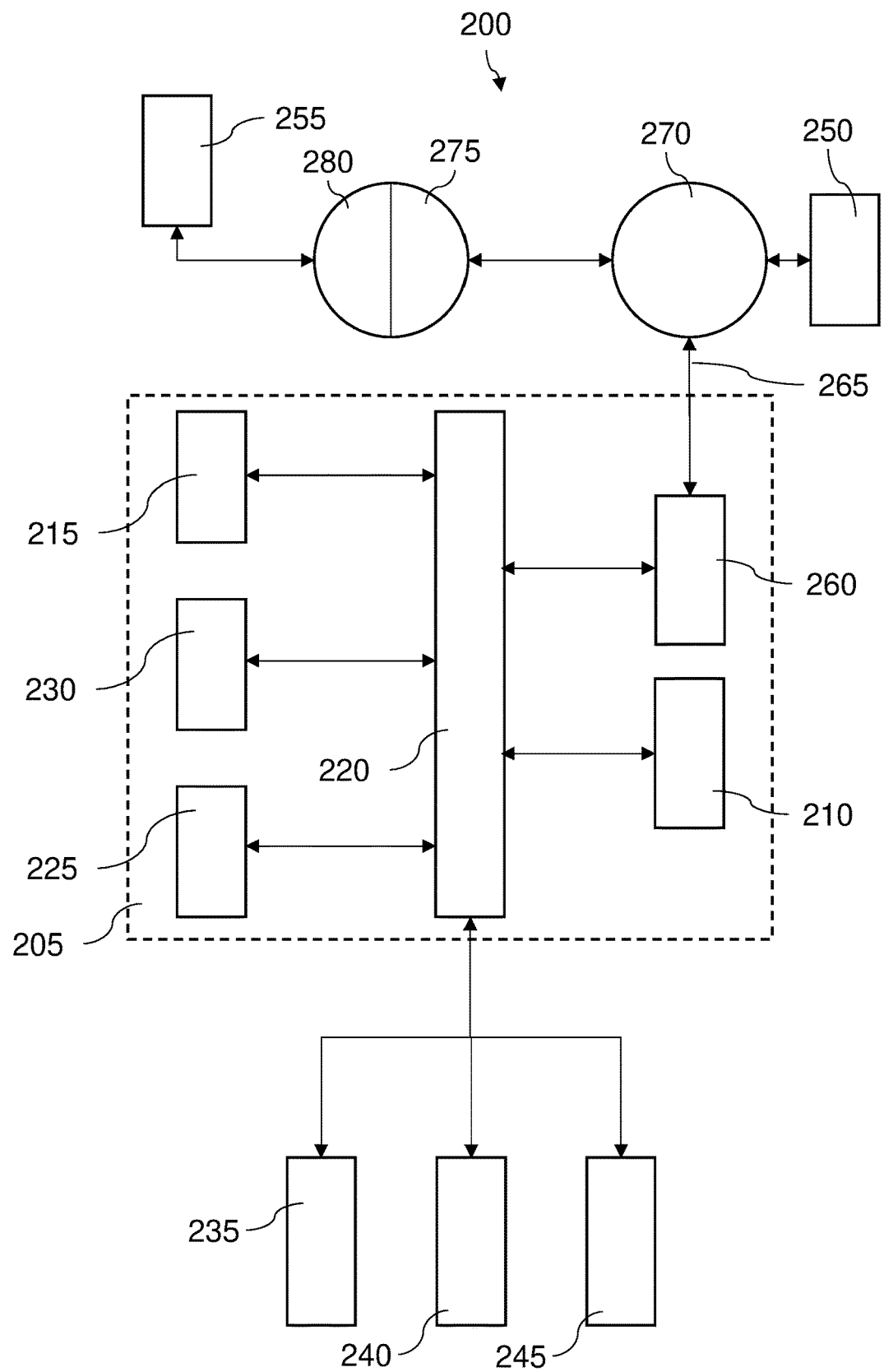
FIG. 2 represents, schematically, a particular embodiment of a computing system that can be used to implement a method object of the present invention.

FIG. 2 represents a block diagram that illustrates an example computer system 200 with which an embodiment may be implemented. In the example of FIG. 2, a computer system 205 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

The computer system 205 includes an input/output (IO) subsystem 220 which may include a bus and/or other communication mechanism(s) for communicating information and/or instructions between the components of the computer system 205 over electronic signal paths. The I/O subsystem 220 may include an I/O controller, a memory controller and at least one I/O port. The electronic signal paths are represented schematically in the drawings, for example as lines, unidirectional arrows, or bidirectional arrows.

At least one hardware processor 210 is coupled to the I/O subsystem 220 for processing information and instructions. Hardware processor 210 may include, for example, a general-purpose microprocessor or microcontroller and/or a special-purpose microprocessor such as an embedded system or a graphics processing unit (GPU) or a digital signal processor or ARM processor. Processor 210 may comprise an integrated arithmetic logic unit (ALU) or may be coupled to a separate ALU.

Computer system 205 includes one or more units of memory 225, such as a main memory, which is coupled to I/O subsystem 220 for electronically digitally storing data and instructions to be executed by processor 210. Memory 225 may include volatile memory such as various forms of random-access memory (RAM) or other dynamic storage devices. Memory 225 also may be used for storing temporary variables or other intermediate information during execution of instructions to be executed by processor 210. Such instructions, when stored in non-transitory computer-readable storage media accessible to processor 210, can render computer system 205 into a special-purpose machine that is customized to perform the operations specified in the instructions.

Computer system 205 further includes non-volatile memory such as read only memory (ROM) 230 or other static storage device coupled to the I/O subsystem 220 for storing information and instructions for processor 210. The ROM 230 may include various forms of programmable ROM (PROM) such as erasable PROM (EPROM) or electrically erasable PROM (EEPROM). A unit of persistent storage 215 may include various forms of non-volatile RAM (NVRAM), such as FLASH memory, or solid-state storage, magnetic disk, or optical disk such as CD-ROM or DVD-ROM and may be coupled to I/O subsystem 220 for storing information and instructions. Storage 215 is an example of a non-transitory computer-readable medium that may be used to store instructions and data which when executed by the processor 210 cause performing computer-implemented methods to execute the techniques herein.

The instructions in memory 225, ROM 230 or storage 215 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 205 may be coupled via I/O subsystem 220 to at least one output device 235. In one embodiment, output device 235 is a digital computer display. Examples of a display that may be used in various embodiments include a touch screen display or a light-emitting diode (LED) display or a liquid crystal display (LCD) or an e-paper display. Computer system 205 may include other type(s) of output devices 235, alternatively or in addition to a display device. Examples of other output devices 235 include printers, ticket printers, plotters, projectors, sound cards or video cards, speakers, buzzers or piezoelectric devices or other audible devices, lamps or LED or LCD indicators, haptic devices, actuators, or servos.

At least one input device 240 is coupled to I/O subsystem 220 for communicating signals, data, command selections or gestures to processor 210. Examples of input devices 240 include touch screens, microphones, still and video digital cameras, alphanumeric and other keys, keypads, keyboards, graphics tablets, image scanners, joysticks, clocks, switches, buttons, dials, slides.

Another type of input device is a control device 245, which may perform cursor control or other automated control functions such as navigation in a graphical interface on a display screen, alternatively or in addition to input functions. Control device 245 may be a touchpad, a mouse, a trackball, or cursor direction keys for communicating direction information and command selections to processor 210 and for controlling cursor movement on display 235. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 240 may include a combination of multiple different input devices, such as a video camera and a depth sensor.

In another embodiment, computer system 205 may comprise an internet of things (IoT) device in which one or more of the output device 235, input device 240, and control device 245 are omitted. Or, in such an embodiment, the input device 240 may comprise one or more cameras, motion detectors, thermometers, microphones, seismic detectors, other sensors or detectors, measurement devices or encoders and the output device 235 may comprise a special-purpose display such as a single-line LED or LCD display, one or more indicators, a display panel, a meter, a valve, a solenoid, an actuator or a servo.

Computer system 205 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 205 in response to processor 210 executing at least one sequence of at least one instruction contained in main memory 225. Such instructions may be read into main memory 225 from another storage medium, such as storage 215. Execution of the sequences of instructions contained in main memory 225 causes processor 210 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 215. Volatile media includes dynamic memory, such as memory 225. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 220. Transmission media can also take the form of acoustic or light waves, such as those generated during radio-wave and infra-red data communications.

Various forms of media may be involved in carrying at least one sequence of at least one instruction to processor 210 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 205 can receive the data on the communication link and convert the data to a format that can be read by computer system 205. For instance, a receiver such as a radio frequency antenna or an infrared detector can receive the data carried in a wireless or optical signal and appropriate circuitry can provide the data to I/O subsystem 220 such as place the data on a bus. I/O subsystem 220 carries the data to memory 225, from which processor 210 retrieves and executes the instructions. The instructions received by memory 225 may optionally be stored on storage 215 either before or after execution by processor 210.

Computer system 205 also includes a communication interface 260 coupled to bus 220. Communication interface 260 provides a two-way data communication coupling to network link(s) 265 that are directly or indirectly connected to at least one communication networks, such as a network 270 or a public or private cloud on the Internet. For example, communication interface 260 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 270 broadly represents a local area network (LAN), wide-area network (WAN), wireless area network (WLAN), campus network, internetwork, or any combination thereof. Communication interface 260 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 260 sends and receives electrical, electromagnetic, or optical signals over signal paths that carry digital data streams representing various types of information.

Network link 265 typically provides electrical, electromagnetic, or optical data communication directly or through at least one network to other data devices, using, for example, satellite, cellular, Wi-Fi, or BLUETOOTH technology. For example, network link 265 may provide a connection through a network 270 to a host computer 250.

Furthermore, network link 265 may provide a connection through network 270 or to other computing devices via internetworking devices and/or computers that are operated by an Internet Service Provider (ISP) 275. ISP 275 provides data communication services through a world-wide packet data communication network represented as internet 280. A server computer 255 may be coupled to internet 280. Server 255 broadly represents any computer, data center, virtual machine, or virtual computing instance with or without a hypervisor, or computer executing a containerized program system such as DOCKER or KUBERNETES. Server 255 may represent an electronic digital service that is implemented using more than one computer or instance and that is accessed and used by transmitting web services requests, uniform resource locator (URL) strings with parameters in HTTP payloads, API calls, app services calls, or other service calls. Computer system 205 and server 255 may form elements of a distributed computing system that includes other computers, a processing cluster, server farm or other organization of computers that cooperate to perform tasks or execute applications or services. Server 255 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 255 may comprise a web application server that hosts a presentation layer, application layer and data storage layer such as a relational database system using structured query language (SQL) or no SQL, an object store, a graph database, a flat file system or other data storage.

Computer system 205 can send messages and receive data and instructions, including program code, through the network(s), network link 265 and communication interface 260. In the Internet example, a server 255 might transmit a requested code for an application program through Internet 280, ISP 275, local network 270 and communication interface 260. The received code may be executed by processor 210 as it is received, and/or stored in storage 215, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 210. While each processor 210 or core of the processor executes a single task at a time, computer system 205 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the description below, the terms "physical network device" designate any element of hardware connected upon a computer network from which said element draws connectivity to other physical and/or virtual network devices.

In the description below, the terms "computer network" designate any embodiment of network 270 disclosed in regard to FIG. 2.

In the description below, the terms "connectivity demand" may refer to any metric typically used to monitor the demand of a communication link, such as a value representative of the connectivity demand corresponds to:

quality: a response time of a distant device, time to reach a DNS server, loss packets, latency of a packet to destination, time to establish an SSL connection and/or capacity: bandwidth use in transmission or reception for example.

In the description below, the terms "local agent" designate a hardware and/or software component paired with a physical network device and configured to, at least:

monitor and report on the connectivity demand of said physical network device, meaning that the local agent is configured to monitor the demand of at least one layer of the OSI (Open Systems Information) stack and emit data towards a computing device and operate at least one trained machine learning model configured to associate a demand prediction at a given term (or for a given duration) for a determined set of inputs, such as a time series representative of past connectivity demand for example.

Such a physical network device, or physical network device, may correspond to any physical network device in a computer network. An edge network device is a physical network device located at the edge of a network that serves as a point of entry or exit for data traffic. These devices are responsible for routing traffic between different networks and can perform a variety of functions such as filtering, encryption, and quality of service (QOS) management. Edge network devices can include routers, switches, firewalls, load balancers, and other network devices that are placed at the edge of a network. These devices are often used to provide connectivity and security between different networks, such as connecting a local area network (LAN) to a wide area network (WAN) or the internet.

Figure 4:
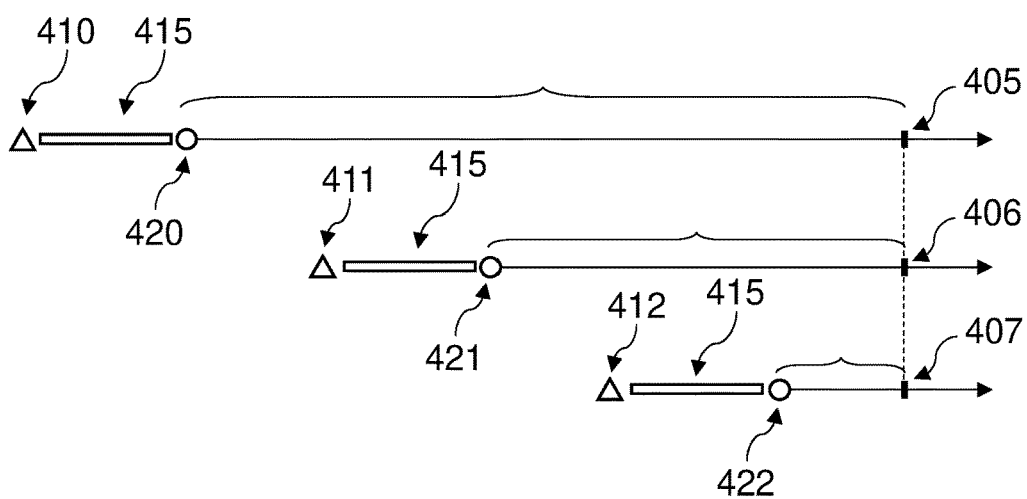
FIG. 4 represents, schematically, a sequence of long-term prediction and short-term training and prediction updating enabled by using the present invention.

The general principle of the present invention can be seen in FIG. 4.

FIG. 4 represents, schematically, a series of predictions, 405, 406 and 407, by a single local agent in relation to a single physical network device.

Each prediction, associated to the same time (or horizon) of prediction, is associated with a prediction training set, 410, 411 and 411, comprising data used to train a machine learning device. These training sets, 410, 411 and 411, correspond to data of the same nature measured up to a different time. These different times are either:

the initial sampling cut-off moment 410 prior to the training prior to the initial prediction 405 for a determined time or any moment, 411 and 412, in the interval from the initial sampling cut-off moment 410 to the determined time for the prediction, 405, 406 and 407.

Prior to each prediction, associated to the same time (or horizon) of prediction, the training set, 410, 411 or 411, is used as an input for a singular machine learning device 415 configured to provide a machine learning model associated data of similar nature to the training sets, 410, 411 and 411, to a prediction at a determined time of prediction.

The outcome of these training steps is the provision of trained machine learning models, 420, 421 and 422, deployed on local agents and operated to provide adjusted predictions, 406 and 407, at the time of the initial prediction 405.

FIG. 1 represents, schematically, a particular succession of steps of the method 100 object of the present invention. This network local connectivity demand prediction method 100 comprises:

a step 105 of long-term local connectivity demand prediction, by a machine learning model operated by a local agent associated to a physical network device that belongs to a computer network, in a duration equivalent to the duration of the long-term prediction, more than one short-term iteration of:

a step 110 of aggregating values representative of, at least:

a connectivity demand of the network comprising at least a physical network device, a purpose of use of the network comprising at least a physical network device, a local long-term connectivity demand prediction for the physical network device, a step 115 of training a machine learning device to produce a machine learning model configured to provide a long-term local connectivity demand prediction, a step 120 of deploying the machine learning model upon at least one local agent, and a step 125 of updating the long-term local connectivity demand prediction by the deployed machine learning model operated by a local agent.

The step 105 of long-term local connectivity demand prediction can be performed, for example, by at least one processor of a computing system 200 configured to execute a set of instructions corresponding to said step 105 of long-term local connectivity demand prediction. Such a set of instructions correspond, at least, to the operation of a trained machine learning model configured to associate a prediction, for a determined time in the future or for a determined duration in the future, of a status of the connectivity of the physical network device in relation to at least one other network device in the computer network. Such a time of prediction may be, for example, one hour into the future.

In the event where the long-term local connectivity demand prediction is related to a capacity prediction:

several parameters may be used, such as traffic metrics, quality metrics, demand metrics, business factors, which may be provided by multiple sources, if necessary, to predict the maximum bandwidth percentage that will be used during the next hour one local agent, such a prediction may correspond to the maximum, the minimum, the average, and estimates when the maximum peak will occur in the next hour, such a prediction may be based upon:

this prediction (% of bandwidth), the edge network device knowledge like the different links available with their bandwidth, if an extra backup link is available, not already activated, if this backup link demand is authorized, a quota associated to this extra link, and the actual demand of this quota and/or a specific business factor giving a coefficient to apply to action thresholds;

the prediction may drive to an action: if the predicted bandwidth demand reaches 75% of the actual available total bandwidth for this edge network device or physical network device, and all verifications are ok (authorization, quota, availability . . . ), then the decision is made to activate the extra link to increase the bandwidth—such action may be triggered by a local or remote actuation device, configured to modify the value of at least one connectivity parameter as a function of the prediction and/or different thresholds may be used to generate insights, such as notifications when 70% of bandwidth will be necessary, when the monthly quota of a link is about to be reached, when the prediction % drove to a backup link activation.

In the event where the long-term local connectivity demand prediction is related to an outage prediction, the following process may take place:

the infrastructure use over the last 30 days may be used as sample, and events may be identified and qualified as «outages», based on a computation such as a fast decrease of connectivity by more than 10% over a short time span, the physical network devices that are mainly responsible for this outage may also be identified, those events are used as targets to enter into a supervised machine learning device using an enriched dataset (up to 40 features) made of connectivity metrics, predictions for each physical network devices that has been responsible for at least one outage event, and that has been classified with a high hub importance, such as:
- a loss ratio variation representative of the evolution of the average loss packets ratio for a physical network device over the next hour,
- a saturation risk representative of a demand for bandwidth exceeding the network capacity over the next hour, three algorithms (such as extra trees random forest regressor, support vector regressor or gradient boost regressor) executed to predict the future points (24 hours) when a physical network device will be responsible for a global outage, and optionally uses the ExtraTreesRegressor algorithm to provide the features importance, the output of the predictions is:
- physical network device responsible for the predicted outage identification, site, tags,
- level of risk measured between 50% and 100%, lower values being ignored, and the timestamp of each outage.

This information can be recorded every 10 mn, to allow further analysis and provide unique statistics on the edge network devices or physical network devices behavior and responsibilities. And this information is aggregated on a map to show the risky sites in the next 24 hours, with a risk level, into what is called a heat map.

All the predictions such as capacity, quality of experience, link quality, application demand are stored in a database, together with the used settings for the machine learning model, and the context made of business factors. It is re-used for further predictions (like outage prediction) and can be replayed to test "What If" scenarios that could improve the prediction accuracy.

All the predictions are analyzed every night to compute the true accuracy, by comparing predictions versus what really happened.

When the accuracy of a prediction service is decreasing, it may launch a deep analysis with "What If" scenarios to calibrate the settings of the machine learning model.

In a time interval corresponding to the interval between the first operation of the machine learning model to the time (date) of the prediction, several iterations of training set assembly (aggregating 110), training 115, deploying 120 and updating 125 the predictions occur.

For example, one such iteration may require ten minutes and a prediction may be formulated for a time which is one hour ahead, which means that four iterations may occur and gradually adjust the prediction.

The step 110 of aggregating prediction can be performed, for example, by at least one processor of a computing system 200 configured to execute a set of instructions corresponding to said step 110 of aggregating.

During the step 110 of aggregating, data of different natures can be associated to generate a training set for a machine learning device.

During the step 110 of aggregating, a long-term prediction may be part of the training set, said long-term prediction being representative of the same connectivity demand parameter or a different connectivity demand parameter. For example, a capacity demand prediction may be used in an outage prediction.

At least part of this data can correspond to, for example, connectivity demand data emanating from local agents.

At least part of this data can correspond to, for example, a label or identifier defining the purpose of connectivity demand data emanating from local agents. Such a purpose can be, for example, emails, videoconference, video streaming, or instant messaging.

At least part of this data can correspond to, for example, connectivity demand predictions emanating from local agents.

At least part of this data can correspond to, for example, values representative of an event external to the computer network. Such an event may correspond to, for example, weather information, stock market information, calendar (holidays) information, or news-related information.

The data aggregated can be associated to a time value, corresponding to a duration or seasonality indicator (such as hour of the day, day, month, day of the week, season).

The data aggregated can correspond to derivative data, such as averages over a determined time period for example.

As it is understood, such data may correspond to, for example:
- evolution of connectivity/latency/loss packets . . . in the last hour,
- average of the links latency for a physical network device during a chunk (10 mn), and
- percentage of «productivity» traffic (coming from applications that are associated with a tag representative of productivity) versus the total traffic coming through the physical network device in a 10 mn chunk, weighted by the physical network device importance in the network.

In particular embodiments, such as the one shown in FIG. 1, the step 110 of aggregating comprises a step 140 of sampling of a subset of information to form a training set, said training set being used during a step, 115 and/or 130, of training a machine learning device.

Depending on the data source (SD-WAN Orchestrator, partner agents, telecommunication operators, or CDR Files for example), values for the data (points) may be collected or streamed at different frequencies, which can vary. Sometimes the information is coming every minute, sometimes every ten minutes, sometimes several times per second. The frequency depends on the particular use case implemented.

Such raw data can be stored as it arrives but depending on the data demand (the use case) the data can be resampled to align all sources on a desired sampling frequency.

For example, a partner delivers some data in streaming, which can be at any frequency, like the control plane data from local agents, and an orchestrator API is used to get ten-minute snapshots of aggregated data. Such data can be mass-transferred at given time intervals.

For capacity predictions, this data can be aggregated into ten-minute chunks or blocks, including, if any, the business factors provided by a client responsible for the local device, to obtain a regular time series dataset with one point every ten minutes. Each column is aggregated using the appropriate formula, min, max, average, sum, and standard deviation for example.

The final data set is built and sampled on the fly if needed, or a specific database table for a use case is created with sampled data, to speed up machine learning operations.

For some use cases, like the prediction of the route quality (gateway and hops), the raw data may be used, and this data can be sampled in multiple versions correlated with the prediction horizon desired. Example: Sampling by 1 minute, then 2 minutes, to predict in the next 10 minutes. Then sampling by 5 minutes to predict a 30-minutes horizon. And then sampling by 10 minutes to predict at 1 hour and 4 hours.

This allows for the provision of multi-timeframes predictions, what will be the short-term quality risk, the middle term and long-term predictions. The route change decision may consider all the timeframes, to evaluate the emergency of the action.

In particular embodiments, such as the one shown in FIG. 1, the step 110 of aggregating comprises a step 145 of prediction duration definition, said prediction duration being used during a step, 115 and/or 130, of training a machine learning device.

Such a step 145 of prediction duration definition can be performed, for example, by at least one processor of a computing system 200 configured to execute a set of instructions corresponding to said step 145 of prediction duration definition.

During such a step 145 of prediction, an input subsystem of a computing device may be operated to automatically or manually set a prediction time for predictions of local agents. Such a prediction time may correspond to an offset from the moment of prediction (such as +1 hour, for example) or to determined times of the day (such as 11 AM, for example).

In particular embodiments, such as the one shown in FIG. 1, the step 150 of enriching a training set, said enriched training set being used during a step, 115 and/or 130, of training a machine learning device.

Such a step 150 of enriching a training set can be performed, for example, by at least one processor of a computing system 200 configured to execute a set of instructions corresponding to said step 150 of enriching a training set.

During this step 150 of enriching, the objective is to add context to every point in a dataset. For instance, if there is a particular situation in an airport, given by the person in charge of a local device as a business factor, and associated to an adjustment coefficient, starting at a timestamp, all points of the dataset starting from this timestamp and until the «alert» is removed are be enriched by the information (Boolean+coefficient).

A weekly deep analysis of the physical network devices behavior can add tags to the physical network device or local devices, which can be used for the dataset constitution.

As such, a specific weather alert situation can be mentioned in the dataset for the defined period, for example.

The final dataset used by the machine learning device is the result of the resampling of the raw data, enriched with the contextual data (computed or provided as business factor).

The predictions made on this dataset may provide more information that is added to another even richer dataset, adding connectivity metrics and prediction results (example: outages predictions).

The step 115 of training a machine learning device can be performed, for example, by at least one processor of a computing system 200 configured to execute a set of instructions corresponding to said step 115 of training a machine learning device.

During this step 115 of training, the data aggregated during the step 110 of aggregating can be used as an input to a machine learning device of a type suited for the particular use case.

Such a machine learning device may use pre-processing algorithms such as LSTM, Transformers, TSNE-XGBOOST (to pre-train models for a later real time demand with a prediction).

Such a machine learning device may use post-processing algorithms such as ExtraTreesRegressor, Support Vector Regressor, GradientBoost Regressor, HistGradientBoost, TSNE-XGBOOST for pre-trained models.

In particular embodiments, such as the one shown in FIG. 1, the step 115 of training a machine learning device comprises:
training 160 an extreme random forest device,
training 165 a support vector machine regressor device and
training 170 a gradient boost regressor device.

For example, using a thirty-day dataset that has been resampled by 10-minute points, enriched with aggregated metrics and business factors, seasonality information may be added, such as the day of the week, the weekend, the hour of the day.

This example assumes that the physical network device associated with local agents have been classified and tagged by an asynchronous process.

The dataset for all the physical network devices of a client, or a tenant of a client as required is obtained.

Then:
a service that executes the pre-trained model (TSNE-XGBOOST) is called for every physical network device that is classified «HIGH» (prediction difficulty level). This process needs 1 or 2 seconds to process for about 50 physical network devices, and it returns a list of HIGH physical network devices with the prediction obtained (using the same dataset),
the global dataset is split by physical network device, to compute predictions physical network device by physical network device and
the physical network devices are classified in three levels: LOW, MEDIUM, HIGH by a classifying algorithm, such as TSNE XGboost—a different strategy being applied for each class of physical network device:
LOW: an ExtraTreesRegressor algorithm may be executed that works very well for these «easy to predict» physical network devices, and takes a fraction of second per physical network devices,
MEDIUM: Those physical network devices may sometimes have some traffic peaks that are not easy to predict with a single algorithm:
an «Outlier Detector» algorithm may be executed to normalize the dataset using percentiles 5-95,
holes in the dataset may be filled,
the behavior of the physical network device during the last 30 days is analyzed to detect if the traffic sometimes bypasses 50% of the bandwidth capacity, or if the physical network device is used in an important manner as a «destination» hub for other physical network devices,
two types of MEDIUM physical network devices may be determined, and two distinct strategies may be applied:
for the first type (no specific behavior), three algorithms can be executed on the physical network device (ExtraTreesRegressor, SVR, GradientBoostRegressor), then the one that has the best confidence is elected, and the «explainability» from the ExtraTreesRegressor is preferably kept—the prediction values of the «best» algorithm result are kept and the prediction includes a table of all predicted values in the prediction horizon (example:
actual prediction+6 points of 10 minutes for 1 hour horizon) and
for the second type (kind of Datacenters, or hubs with a strong relational hub position), a Hist- GradientBoosRegressor algorithm is executed as it better captures sudden traffic variations, with less latency and «boosted» prediction, HIGH: for this class of physical network devices, the computation has already been done at the first step, so we consider this prediction result.

This allows for obtaining one prediction for every physical network device, including the max peak during the next hour, which is the main information needed.

Preferably, each prediction is made with additional descriptive information (the site, physical network device, map of links, available & authorized backup links, quotas . . . ).

From there the decision is made to activate (prediction>=75%) or disable (prediction<50%) an extra link if any. The decision process is using backup/quota/authorization/prediction.

If the action is ACTIVATE or DISABLE a backup link, and everything is ok, then it is possible to communicate with the physical network device to change the internal policies to adjust the backup link demand (could be also to change traffic priorities to focus for instance on videoconference applications and forbidden demand for a critical period).

Depending on the available insights and client subscriptions, it is possible, during the dressing process, notify an insight for any action done, or prediction threshold, or quota demand.

The final prediction (in a json format) can be saved into a database table for future demand, statistics, Smart Metrics, API Gateway and for the nightly accuracy checking.

In particular embodiments, the method 100 object of the present invention comprises a step 101 of associating a prediction reliability indicator to at least one physical network device, such a reliability indicator being aggregated during the step 110 of aggregating, providing 105 a long-term prediction and/or updating 125 the long-term prediction.

Such a step 101 of associating can be performed manually, via input means of a computing device, or automatically.

In embodiments in which the step 101 of associating is performed automatically, a set of instructions representative of an algorithm may be executed by a computing device in order to, from a series of past long-term predictions and corresponding real events which the predictions accurately or inaccurately predicted, determine a reliability indicator. The more accurate predictions in the past, the higher is the reliability indicator for a specific physical network device.

Such a step 101 of associating may use a classifier algorithm, such as a trained machine learning classifier model, in order to associate an indicator representative of a class of reliability ("HIGH", "MEDIUM", "LOW", for example) for physical network devices.

In particular embodiments, the method 100 object of the present invention comprises a step 102 of associating a network importance indicator to at least one physical network device, such a network importance indicator being aggregated during the step 110 of aggregating, providing 105 a long-term prediction and/or updating 125 the long-term prediction.

Such a step 102 of associating can be performed manually, via input means of a computing device, or automatically.

In embodiments in which the step 102 of associating is performed automatically, a set of instructions representative of an algorithm may be executed by a computing device in order to, from a series of volume of exchanges and/or number of physical network devices communicating with a targeted physical network device, determine a network importance indicator of said targeted physical network device. The more a targeted physical network device is associated with a high volume of exchanges and/or number of physical network devices communicating with said targeted physical network device, the higher the network importance indicator.

Such a step 102 of associating may use a classifier algorithm, such as a trained machine learning classifier model, in order to associate an indicator representative of a class of reliability ("HIGH", "MEDIUM", "LOW", for example) for physical network devices.

The step 120 of deploying a machine learning model upon at least one local agent can be performed, for example, by at least one processor of a computing system 200 configured to execute a set of instructions corresponding to said step 120 of deploying.

During this step 120 of deploying, a trained machine learning model can be downloaded by a local agent and stored in a memory pending operation of this trained machine learning model.

The step 125 of updating the long-term local connectivity demand prediction can be performed, for example, by at least one processor of a computing system 200 configured to execute a set of instructions corresponding to said step 125 of updating.

During this step 125 of updating, the trained machine learning model is operated to provide a connectivity demand prediction for the time (date) of the initial prediction.

In particular embodiments, such as the one shown in FIG. 1, the method 100 object of the present invention comprises:
  a step 130 of training a machine learning device to produce a machine learning model configured to classify a local connectivity demand pattern, and
  a step 135 of operating the trained machine learning model to classify a local connectivity demand pattern according to at least one of:
    a prediction difficulty for the physical network device and/or
    an importance of the physical network device in the computing network as a hub in said network.

The prediction difficulty ("LOW", "MEDIUM" or "HIGH") can be based on previous predictions and the physical network device behavior over a specific time frame (last six months), and the function of the physical network device in the infrastructure graph.

This classification can be used to choose the machine learning strategy for capacity prediction, for example.

The importance of the physical network device can be based on traffic interactions (IP destination is on a network physical network device, output to another network physical network device . . . ), and the number of physical network devices which are connected to this physical network device. It results in three classes by importance level: "HUB_0", "HUB_1" and "HUB_2". This classification allows the selection of "meaningful" physical network devices in the network, for instance to evaluate if an outage prediction is appropriate for this physical network device, because it has an important impact on the global enterprise network.

In particular embodiments, such as the one shown in FIG. 1, the method 100 object of the present invention comprises a step 155 of network local connectivity adjustment as a function of a long-term local connectivity demand prediction.

The step 155 of network local connectivity adjustment can be performed, for example, by at least one processor of a computing system 200 configured to execute a set of instructions corresponding to said step 155 of network local connectivity adjustment.

During this step 155, there can be two types of adjustments. The first type of adjustments are network adjustments which are policies that may be transmitted to components of the network to impact the connectivity between physical and/or virtual devices in the networks. For example, particular protocols or services may be blocked or connections between two devices may be prohibited. The second type of adjustments are application adjustment to impact the sending, receiving of data through the networks or the move of an application from the local system to another computer.

Such a step 155 may be obtained by mapping the links for the physical network device, to verify if a backup link exists, if it is in use or in standby, this link can be operated remotely, and if there is a quota limitation for this link (date of start in the month and monthly allocation, plus decisions of thresholds and actions).

Example: A customer may for instance authorize the demand of a backup link, but setup a quota (10 GB starting the 5th of the month) and giving 2 quote actions: insight when the monthly quota demand is at 70%, and insight and block the link demand once the quota is used at 99%.

Then depending on the prediction (% of bandwidth) and the settings for thresholds, if the prediction for next hour max is superior or equal to 75%, and there is a link which can be used, an order to the orchestrator can be sent or directly to the physical network device to activate this backup link, which adds its bandwidth to the global physical network device bandwidth.

This step is described in the detailed process for capacity prediction. In a separate temporality (once a week for instance, or once a day), the classification algorithms are executed to train a model (heavy power demand). The resulting model is saved to be reused with fresh data added, during the capacity prediction process, but to re-use a pre-trained model with added data is extremely fast compared with the original model calculation.

For other algorithms in the capacity process for instance, the models are created, trained, tested, evaluated, and finally applied to the full dataset, every 10 minutes, for every physical network device, to adjust the predictions. This is possible because the algorithms and settings of the present invention are very fast.

If the predicted capacity need is under 50% and there is an activated backup link, or the activated backup link is blocked for quota reasons, then the backup link is disabled, which comes back in standby mode.

So, for each prediction, the physical network device environment (links availability, etc.) and the prediction (%) are obtained.

This information is used to create a smart metric: if the percentage of connectivity required in the next hour is over 75% but there is no available, authorized and quota free link to provide extra bandwidth, there is an outage risk.

Figure 3:
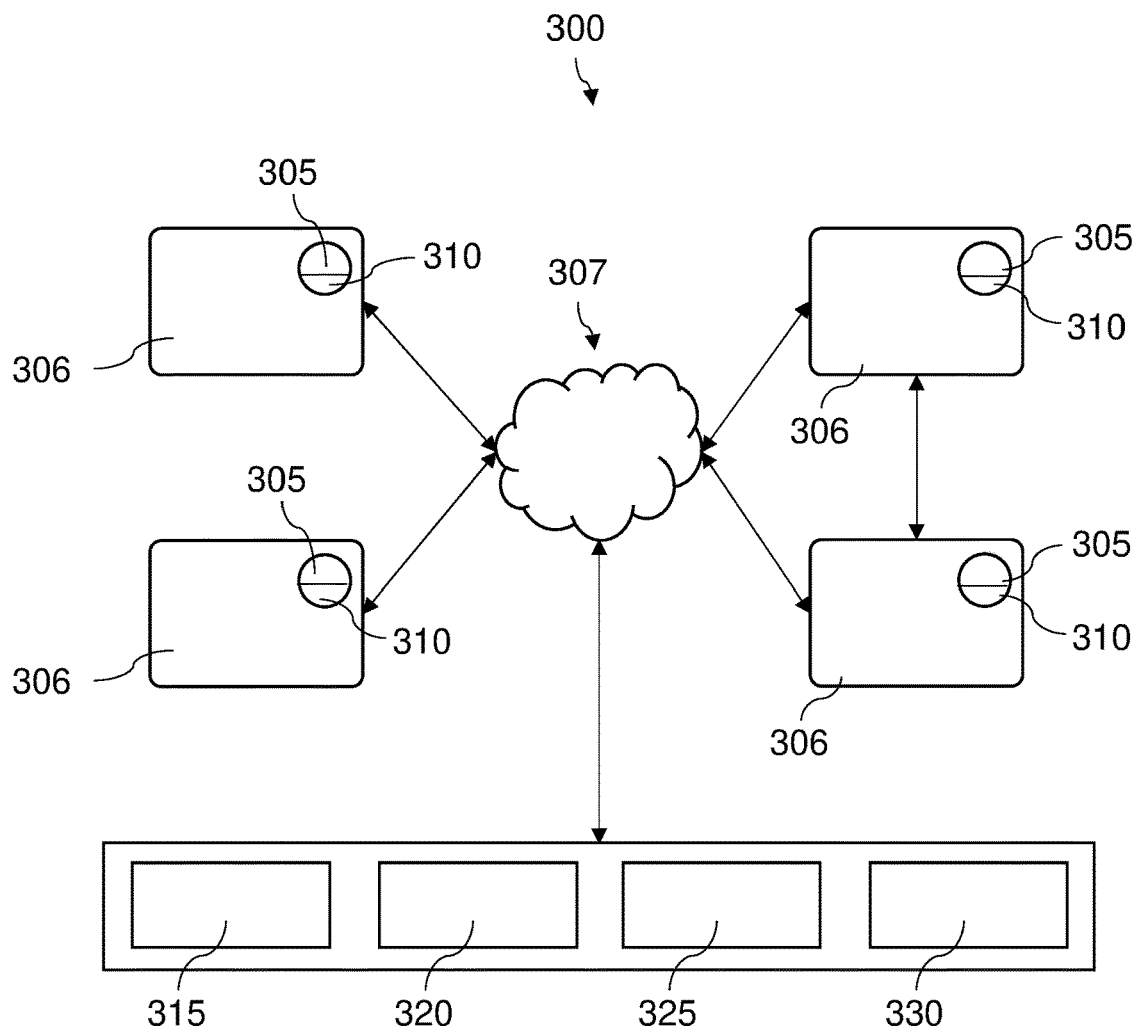
FIG. 3 represents, schematically, a particular embodiment of the device object of the present invention.

FIG. 3 represents, schematically, a particular embodiment of the device 300 object of the present invention. This network local connectivity demand prediction device 300 comprises:
- a local agent 305 associated to a physical network device 306 that belongs to a computer network 307, comprising a means 310 of operating a machine learning model to provide a long-term local connectivity demand prediction,
- a means 315 of aggregating values representative of, at least:
  - a connectivity demand of the network comprising at least a physical network device,
  - a purpose of use of the network comprising at least a physical network device,
  - a local long-term connectivity demand prediction for the physical network device,
- a means 320 of training a machine learning device to produce a machine learning model configured to provide a long-term local connectivity demand prediction,
- a means 325 of deploying the machine learning model upon at least one local agent, and
- a means 330 of updating the long-term local connectivity demand prediction by the deployed machine learning model operated by a local agent.

the means of aggregating, training and deploying being configured to operate iteratively, more than once, during an equivalent to the duration of the long-term prediction.

Particular embodiments of the means of this device 300 are disclosed in regard to the method 100 object of the present invention.

Object of the Invention

The present invention is intended to remedy all or part of these disadvantages.

All embodiments disclosed and claimed herein are directed to a computer-implemented programmed processes that interact with digital data to provide a practical application of computing technology to the problem of network resource management and maintenance that can be used to increase the reactivity of the information technology infrastructure of a company. The disclosure is not intended to encompass techniques for organizing human activity, for performing mental processes, or for performing a mathematical concept, and any interpretation of the claims to encompass such techniques would be unreasonable based upon the disclosure as a whole.

To this effect, according to a first aspect, the present invention aims at a network local connectivity demand prediction method, comprising:
- a step of long-term local connectivity demand prediction, by a machine learning model operated by a local agent associated to a physical network device that belongs to a computer network,
- in a duration equivalent to the duration of the long-term prediction, more than one short-term iteration of:
  - a step of aggregating values representative of, at least:
    - a connectivity demand of the network comprising at least a physical network device,
    - a purpose of use of the network comprising at least a physical network device,
    - a local long-term connectivity demand prediction for the physical network device,
  - a step of training a machine learning device to produce a machine learning model configured to provide a long-term local connectivity demand prediction,
  - a step of deploying the machine learning model upon at least one local agent, and
  - a step of updating the long-term local connectivity demand prediction by the deployed machine learning model operated by a local agent.

Thanks to these provisions, in between the initial prediction and the end of the prediction term, the machine learning model is retrained and reused to update the initial prediction, leading to a more accurate prediction capacity.

In particular embodiments, the step of aggregating values further aggregates values representative of an event external to the computer network.

Such embodiments allow for the improvement of the predictions performed by local agents as a function of external events, such as the evolution of the weather, of the evolution of a stock price, of the presence of holidays, or of social movements for example.

In particular embodiments, the method object of the present invention comprises:
- a step of training a machine learning device to produce a machine learning model configured to classify a local connectivity demand pattern, and
- a step of operating the trained machine learning model to classify a local connectivity demand pattern according to at least one of:
  - a prediction difficulty for the physical network device and/or
  - an importance of the physical network device in the computing network as a hub in said network.

In particular embodiments, the step of aggregating comprises a step of sampling of a subset of information to form a training set, said training set being used during a step of training a machine learning device.

Such embodiments allow for the adjustment of the sampling of the dataset and the horizon of prediction, according to a specific use case. These settings are in the database attached to a particular service (use case) and used to prepare the dataset before enrichment and machine learning. Those settings are part of the prediction, which is saved in the database, so that it is possible to «replay» the prediction with the exact original settings, whenever the settings are changed for future predictions.

In particular embodiments, the step of aggregating comprises a step of prediction duration definition, said prediction duration being used during a step of training a machine learning device.

The prediction duration is the prediction horizon, or the distance for the future prediction. Example: a dataset by points of ten minutes. For this particular use case a prediction horizon of one hour is the best compromise. For this dataset by increments of ten minutes, predicting at a horizon of one hour means that it is needed to predict the six next points in the time series. In particular embodiments, the step of enriching a training set, said enriched training set being used during a step of training a machine learning device.

The purpose of the enrichers is to build extra information from raw metrics. Example: the orchestrator is giving some information that can be considered as the IP destination for each traffic volume sent by an application through a device. One part of this traffic is then directed to the cloud (external destination), and the rest of the traffic is directed to another physical network device in the global enterprise infrastructure, this destination physical network device having the role of datacenter or hub.

By aggregating this information and making specific computations, one can compute for every physical network device during a period (10-minute chunk) the total incoming traffic volume (coming in the physical network device from another physical network device), and the detail by application, for instance the incoming traffic coming from other physical network devices or productivity-tagged applications.

This produces two types of metrics:
- the incoming traffic volume (in bytes and in hours), and
- the part of this incoming traffic which is associated with productivity-tagged apps.

In particular embodiments, the method object of the present invention comprises a step of network local connectivity adjustment as a function of a long-term local connectivity demand prediction.

Such embodiments allow for the dynamic reconfiguration of the infrastructure as a function of the predictions provided, to avoid major connectivity issues.

In particular embodiments, a value representative of the connectivity demand corresponds to a response time of a distant device.

In particular embodiments, the step of training a machine learning device comprises:
- training an extreme random forest device,
- training a support vector machine regressor device and
- training a gradient boost regressor device.

In particular embodiments, the method object of the present invention comprises a step of associating a prediction reliability indicator to at least one physical network device, such a reliability indicator being aggregated during the step of aggregating, providing a long-term prediction and/or updating the long-term prediction.

In particular embodiments, the method object of the present invention comprises a step of associating a network importance indicator to at least one physical network device, such a network importance indicator being aggregated during the step of aggregating, providing a long-term prediction and/or updating the long-term prediction.

According to a second aspect, the present invention aims at a network local connectivity demand prediction device, comprising:
- a local agent associated to a physical network device that belongs to a computer network, comprising a means of operating a machine learning model to provide a long-term local connectivity demand prediction,
- a means of aggregating values representative of, at least:
  - a connectivity demand of the network comprising at least a physical network device,
  - a purpose of use of the network comprising at least a physical network device,
  - a local long-term connectivity demand prediction for the physical network device,
- a means of training a machine learning device to produce a machine learning model configured to provide a long-term local connectivity demand prediction,
- a means of deploying the machine learning model upon at least one local agent, and
- a means of updating the long-term local connectivity demand prediction by the deployed machine learning model operated by a local agent.

the means of aggregating, training and deploying being configured to operate iteratively, more than once, during an equivalent to the duration of the long-term prediction.

The device object of the present invention presents the same advantages as the method object of the present invention.

The invention claimed is:

1. A network local connectivity demand prediction method, comprising:
   providing a local agent with an initial prediction of a local connectivity demand during a duration, said local agent is associated to a physical network device that belongs to a computer network comprising at least a physical network device, performing within a time period equivalent to the duration, more than one iteration of:
- a step of aggregating data during an increment of time within said time period, said data includes values representative of, at least:
  - a connectivity demand of the computer network comprising at least a physical network device,
  - a purpose of use of the computer network comprising at least a physical network device,
  - a local connectivity demand prediction for the physical network device,
- a step of training with said data a machine learning device to produce a machine learning model configured to provide a local connectivity demand prediction,
- a step of deploying the machine learning model upon at least one local agent, and
- a step of providing an updated prediction by updating the initial prediction in accordance with the deployed machine learning model operated by a local agent.

2. The method according to claim 1, wherein said data further includes values representative of an event external to the computer network.

3. The method according to claim 1, wherein the machine learning model is further configured to classify patterns of connectivity demand, and wherein said method further includes a step of operating the machine learning model to classify a local connectivity demand pattern according to at least one of:
- a prediction difficulty for the physical network device and/or
- an importance of the physical network device in the computer network as a hub in said computer network.

4. The method according to claim 1, in which the step of aggregating data comprises a step of sampling of a subset of information to form a training set, said training set being used during a step of training a machine learning device.

5. The method according to claim 1, in which the step of aggregating data further comprises a step of defining prediction duration, said prediction duration being used during a step of training a machine learning device.

6. The method according to claim 1, further comprising a step of enriching a training set, said enriched training set being used during a step of training a machine learning device.

7. The method according to claim 1, further comprising a step of network local connectivity adjustment in accordance with said updated prediction.

8. The method according to claim 1, in which a value representative of the connectivity demand corresponds to a response time of a device.

9. The method according to claim 1, in which the step of training a machine learning device comprises:
- training an extremal random forest device,
- training a support vector machine regressor device and
- training a gradient boost regressor device.

10. The method according to claim 1, wherein said step of aggregating data further includes associating a prediction reliability indicator to at least one physical network device and wherein said step of providing an updated prediction is performed in accordance with said prediction reliability indicator.

11. The method according to claim 1, wherein said step of aggregating data further includes associating a network importance indicator to at least one physical network device and wherein said step of providing an updated prediction is performed in accordance with said network importance indicator.

12. A network local connectivity demand prediction device, comprising:
- a local agent associated to a physical network device, said local agent is configured to provide prediction of a local connectivity demand during a duration,
- a local connectivity demand prediction device configured for: aggregating data within a time period equivalent to the duration, said data includes values representative of, at least:
  - a connectivity demand of a computer network comprising at least a physical network device,
  - a purpose of use of the computer network comprising at least a physical network device,
  - a local connectivity demand prediction for the physical network device,
- a machine learning device configured to be trained and to produce a machine learning model for providing local connectivity demand prediction,
- wherein said local connectivity demand prediction device is configured for deploying the machine learning model in said local agent, and
- wherein said local agent is configured for updating the prediction by the machine learning model operated by the local agent; and
- wherein said local connectivity demand prediction device and said local agent are configured to operate iteratively, more than once, during the time period.

* * * * *